US007823021B2

(12) United States Patent
Abe

(10) Patent No.: US 7,823,021 B2
(45) Date of Patent: *Oct. 26, 2010

(54) SOFTWARE PROCESS MONITOR

(75) Inventor: Julianne Yoko Abe, Cockeysville, MD (US)

(73) Assignee: United Parcel Service of America, Inc., Atlanta, GA (US)

( * ) Notice: Subject to any disclaimer, the term of this patent is extended or adjusted under 35 U.S.C. 154(b) by 1547 days.

This patent is subject to a terminal disclaimer.

(21) Appl. No.: 11/139,339

(22) Filed: May 26, 2005

(65) Prior Publication Data

US 2006/0271916 A1    Nov. 30, 2006

(51) Int. Cl.
G06F 11/30    (2006.01)
(52) U.S. Cl. .................... 714/38; 714/2; 717/127
(58) Field of Classification Search .................... 714/38, 714/2; 717/127
See application file for complete search history.

(56) References Cited

U.S. PATENT DOCUMENTS

| 5,164,928 A | 11/1992 | Oliver et al. |
| 5,371,883 A | 12/1994 | Gross et al. |
| 5,590,277 A | 12/1996 | Fuchs et al. |
| 5,636,376 A | 6/1997 | Chang |
| 5,715,386 A | 2/1998 | Fulton et al. |
| 5,805,790 A | 9/1998 | Nota et al. |
| 5,943,689 A * | 8/1999 | Tamer .................... 711/166 |
| 5,948,112 A | 9/1999 | Shimada et al. |
| 6,125,401 A * | 9/2000 | Huras et al. ................. 719/310 |
| 6,240,335 B1 | 5/2001 | Wehrung et al. |
| 6,389,449 B1 | 5/2002 | Nemirovsky et al. |
| 6,457,142 B1 | 9/2002 | Klemm et al. |
| 6,470,230 B1 | 10/2002 | Toprac et al. |
| 6,591,379 B1 | 7/2003 | LeVine et al. |
| 6,615,215 B1 | 9/2003 | Petty |
| 6,665,758 B1 | 12/2003 | Frazier et al. |
| 6,745,350 B1 * | 6/2004 | Cline et al. .................... 714/9 |
| 6,810,493 B1 | 10/2004 | Donaldson et al. |
| 6,907,605 B1 * | 6/2005 | Ault et al. .................... 718/100 |
| 6,931,526 B1 | 8/2005 | Bacha et al. |
| 7,000,150 B1 * | 2/2006 | Zunino et al. .................. 714/38 |
| 7,086,009 B2 | 8/2006 | Resnick et al. |
| 2002/0016866 A1 * | 2/2002 | Menges et al. .............. 709/315 |

(Continued)

FOREIGN PATENT DOCUMENTS

EP    974903 A2    1/2000

OTHER PUBLICATIONS

Declaration of Julianne Y. Abe.

(Continued)

*Primary Examiner*—Joshua A Lohn
*Assistant Examiner*—Chae Ko
(74) *Attorney, Agent, or Firm*—Alston + Bird, LLP

(57) ABSTRACT

A monitor program executes a set of client processes upon reboot of a computer, starts, stops and monitors client processes running on the computer, and/or detects and recovers automatically from process crashes. The program monitors a client process using a supervisory thread it creates when the client process is started, and uses the process's handle to detect its termination. When process termination is detected, the state table within the monitor program is checked to determine if the client process crashed or was exited normally. If the exit was the result of a crash, the program can automatically execute crash recovery using a preconfigured plan.

23 Claims, 5 Drawing Sheets

U.S. PATENT DOCUMENTS

| | | |
|---|---|---|
| 2002/0184295 A1 | 12/2002 | Bartley |
| 2003/0028821 A1 | 2/2003 | Jin et al. |
| 2003/0037289 A1 | 2/2003 | Singh et al. |
| 2003/0167421 A1* | 9/2003 | Klemm ................ 714/37 |
| 2003/0217123 A1* | 11/2003 | Anderson et al. ........ 709/219 |
| 2004/0098724 A1 | 5/2004 | Demsey et al. |
| 2004/0153823 A1 | 8/2004 | Ansari |
| 2004/0215997 A1* | 10/2004 | Anderson et al. ............ 714/2 |
| 2004/0230970 A1 | 11/2004 | Janzen |
| 2005/0055399 A1* | 3/2005 | Savchuk ................ 709/203 |
| 2005/0216880 A1* | 9/2005 | Erickson et al. ........... 717/101 |
| 2005/0235136 A1* | 10/2005 | Barsotti et al. .............. 713/1 |
| 2006/0004805 A1* | 1/2006 | Grunkemeyer et al. ..... 707/101 |
| 2006/0005085 A1* | 1/2006 | Zunino et al. ............. 714/47 |
| 2006/0271205 A1 | 11/2006 | Abe |
| 2006/0271918 A1 | 11/2006 | Abe |

OTHER PUBLICATIONS

Declaration of David Salzman.

B. Plattner, "Real-Time Execution Monitoring," IEEE Trans. Software Engineering, vol. SE-10. No. 6, Nov. 1984, pp. 756-764.

Keith Marzullo et al., "Tools for Distributed Application Management," Cornell University, pp. 42-51, Aug. 1991.

Yennun Huang et al., "NT-SwiFT Software Implemented Fault Tolerance on Windows NT," 10 pages; USENIZ Association; Proceedings of the 2nd USENIX Windows NT Symposium, Seattle, WA, Aug. 3, 1998-Aug. 4, 1998.

International Preliminary Report On Patentability from corresponding International Application No. PCT/US2006/019529 dated May 2, 2007.

Tanenbaum, A., "Modern Operating Systems" 1992, Prentice Hall, Englewood, New Jersey, US, pp. 293-303.

* cited by examiner

STARTPROGRAM

STOP PROGRAM

SOFTWARE PROCESS MONITOR

BACKGROUND OF THE INVENTION

1. Field of the Invention

The invention relates to methods, apparatuses, and computer-readable media for monitoring and managing processes such as applications, communication programs, and utility programs, which run on a computer.

2. Description of the Related Art

Computers use processes such as applications, communications programs, and utility programs, to carry out user— and computer-directed tasks. In many computer environments, each process runs independently of others and defines its own rules regarding its initiation, termination and interaction with other processes. Thus, from a general perspective, it is difficult to ascertain the rules governing execution of the processes and their interaction with other processes since the rules are obscured in the code of the processes. It would be desirable to provide a system in which monitoring and control of the processes can be performed externally to the processes, and the rules governing initiation, termination and interaction of processes could be defined externally to the processes. This would greatly simplify control of the processes and enable the rules governing their interaction to be understood by a programmer in a relatively straightforward manner.

Those of skill in this art understand that, for a variety of reasons, a process running on a computer can 'crash,' generally meaning that the code fails to operate correctly or otherwise ends unexpectedly. A crash can result from numerous causes, including, for example, the presence of a bug in a process, a process receiving an input state for which it was not programmed to respond, data or code corruption resulting from errors or other causes, a memory or cache overflow, code conflicts, etc. It would be desirable to provide a system with the capability to monitor processes externally to detect any improper operation of the processes. Furthermore, it would be desirable, in the event of a crash, to enable the processes to be readily restored to execution by restart, reboot, or both, automatically without requiring any action on the part of the user. In addition, it would be desirable if the process could be restarted or the device rebooted using a recovery plan configured in advance for such process, providing flexibility in the way that a process recovers from a crash.

Another problem with previous technologies is the manner in which one process controls other processes. In previous approaches, a running process would not have the ability to initiate or terminate another related process in a controlled manner. It would be desirable to be able to initiate a process in such a way as to maintain the ability to terminate from code external to this particular instance at a later time, and to pre-configure its recovery behavior in the event of a crash. In the case of a process requested to terminate, it would further be desirable to provide the capability to perform configurable exit processing prior to the process's termination.

Thus, it would be desirable to provide apparatuses, computer-readable media, and methods for monitoring and managing client processes such as applications, communication programs, and utility programs, which run on a computer, that are capable of overcoming the problems with previous technologies as noted hereinabove.

BRIEF SUMMARY OF THE INVENTION

The invention described and claimed herein, in each of its various embodiments, overcomes one or more of the disadvantages of previous technologies as noted hereinabove.

A method according to one embodiment of the invention comprises the step of creating a supervisory thread external to a process in response to starting the process running on a computer's processor. The supervisory thread is created to monitor a handle received from an operating platform upon starting the process. The supervisory thread can be created in response to starting of a process identified by an initialization procedure that defines a set of one or more processes to be started upon boot up or restart of a computer. Furthermore, a process can be started in a variety of additional ways, such as by a request originating from another process, a request from a user via an input unit of the computer, a request from an external device via an interface unit of the computer, or a combination of the foregoing. The supervisory thread for the process is created by a monitor program in response to that request. The method of this embodiment can be used to create a supervisory thread for each running process, which has a corresponding handle so that the process can be monitored externally to the process itself. This feature of the invention makes it possible for the supervisory thread to be used to recover automatically if its corresponding process crashes, without requiring any user action. The user can thus be saved the time, effort, and trouble of taking manual action to recover from a process crash.

Another embodiment of the invention is a method comprising the steps of detecting a crash of a process running externally to the process; and automatically executing a crash recovery plan to recover from the crash of the process. The detecting step can comprise substeps of receiving an exit notification indicating that the process has terminated; checking whether a normal termination flag for the process has been set prior to the process terminating; and determining whether the process crashed based on the checking substep. The execution of the crash recovery plan can be performed based on the determining substep. The crash recovery plan can be defined specifically for the process, or it can be a default plan to be executed if no specific plan is defined for the process. The crash recovery plan can be defined within the monitor program, the client process, or in memory external to either the monitor program or process. The crash recovery plan can direct the processor to reboot the computer, restart the crashed process, or both. Furthermore, the crash recovery plan can direct the processor to start, stop, or both, any additional processes in order to recover from a crash.

The claimed invention is also directed to various embodiments of computer-readable media which when executed by a computer perform the methods identified above.

Yet another embodiment of the invention is directed to a computer comprising a processor and a memory coupled to the processor. The memory stores a monitor program having a supervisory thread for a corresponding process running on the computer. The supervisory thread runs separately or externally to the corresponding process, and thus enables the processor to use the supervisory thread to externally control its corresponding process. The monitor program can comprise a start program for receiving a handle from an operating platform in response to the start of the process running on the operating platform, and for creating the supervisory thread to include the handle for use in monitoring the process. The process can be customized to allow the monitor program to interact with it. A supervisory thread can be added internally to the process which monitors a unique interprocess communication object (such as a semaphore, mutex, event, etc.) known to both the monitor program and the corresponding process. The monitor program may make a request to terminate the corresponding process by signaling the interprocess communication object, which triggers the process to exercise a customized termination procedure to terminate itself. The termination procedure may involve saving data, or performing other tasks prior to termination. Triggering of the start and stop programs can occur in one of various ways, and may originate from another running process executed by the processor, a user via a user interface provided by the computer's input and output units, an external device coupled to the computer via the computer's interface unit, or a combination of the foregoing. The monitor program carries out the start and stop requests based on one or more rules external to the process, that define whether under the circumstances a process that is the target of a request can be started or stopped. The memory can store an initialization procedure defining a set of one or more processes that are started by the processor upon boot up of the computer. The monitor program can further comprise a crash detection and recovery module storing a crash recovery plan. The crash recovery plan defines one or more functions to be carried out by the processor to recover from a process crash. The processor executes the recovery plan to recover automatically from a crash of the process without requiring involvement of a user of the computer. The crash detection and recovery module comprises a process state table storing a normal termination flag which is set by the monitor program if the process terminates normally, and is not set by the process if the process terminates due to a crash. The monitor program further comprises an event handler receiving an exit notification signal from the external supervisory thread for the process upon its termination, and forwarding the exit notification to the crash detection and recovery module for determination as to whether the process terminated normally or as the result of a crash. Based on this determination, the crash detection and recovery module can determine whether a process terminated normally or as the result of a crash requiring such module to execute the crash recovery plan.

In another embodiment of the invention, a computer comprises a processor; and a memory coupled to the processor. The memory stores a crash detection and recovery module defining a recovery plan for a process executed by the processor. The crash detection and recovery module automatically detects a crash of the process and recovers from the crash of the process by executing the recovery plan without requiring any action by a user of the computer. The recovery plan can be defined specifically for the process. Alternatively, the recovery plan can be a default plan used to recover from the crash of the process in the event no recovery plan is specifically defined for the process. The recovery plan can dictate that the computer is to be rebooted, or the process restarted, or both.

In some embodiments, the monitor program stored in the memory can further include an event handler receiving exit notification signals from the process control module indicating that the processes have terminated. The event handler notifies the crash detection and recovery module of the exit notification signals from the terminating processes and the process control module. In some embodiments, the process control module has a queue storing start and stop requests to be executed by the process control module as permitted by the rules. In some embodiments, the monitor program comprises an initialization program configured to define the start and stop requests to be executed upon booting the computer, the initialization program inputting the configured start and stop requests into the queue for execution upon booting the computer. The start and stop requests in the queue can originate from different sources, including another running process, an input device connected to the processor which is operated by a user, or an interface unit connected to the processor that receives the request from an external device, or combinations of the same. The crash recovery plans can be such as to define whether the device is to be rebooted, one or more processes restarted, or both, following crashes of respective processes. The crash detection and recovery module provides the identity of any process to be rebooted or restarted to the initialization program for input to the queue for execution upon reboot of the computer or restart of a process. One of the crash recovery plans can be a default plan to be used in the event that no custom crash recovery plan is defined for a process. The supervisory thread incorporated into a client process can include termination programming defining actions to be carried out by the process prior to its termination if it is signaled to stop execution by the process control module. The monitor program, or more specifically, the process control module, can comprise a start program for starting processes, and a stop program for stopping processes.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 4:
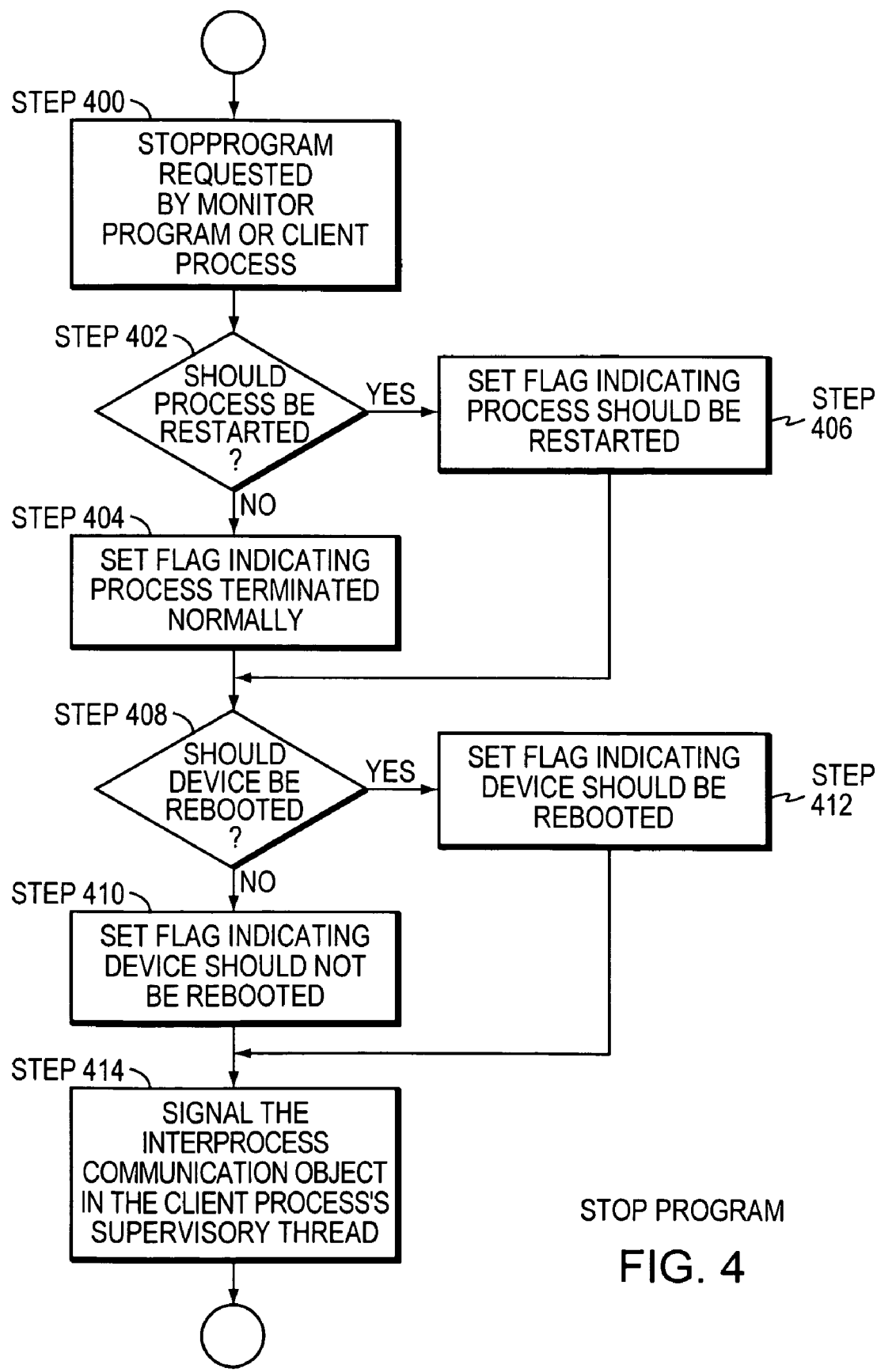
Figure 5:
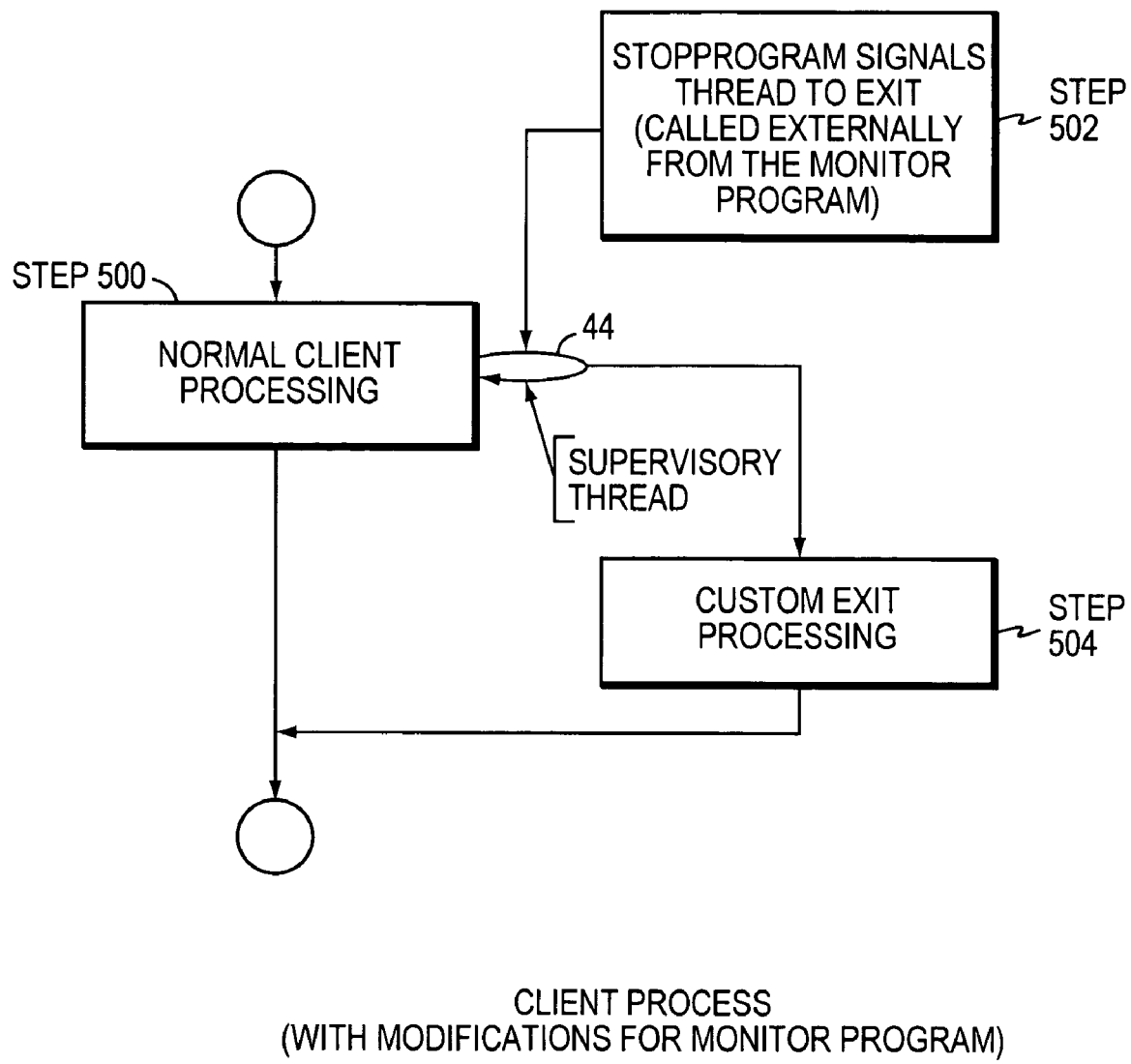

FIG. 4 is a flowchart of an embodiment of a method carried out by the stop program of the monitor program in order to stop a process and notify the crash detection and recovery module that the exiting process has stopped; and FIG. 5 is a flowchart of an embodiment of a method in which the stop program notifies the supervisory thread of a process targeted to stop in order to initiate customized exit processing.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Definitions

'And/or' means any one, some, or all of the things meant by the terms preceding and succeeding such term. Thus, "A, B, and/or C" means "any one, some, or all of A, B, and C."

'Computer' is used herein consistently with the meaning those of ordinary skill in the art attribute to such term. It refers to a device that has a memory and a processor receiving input data from a memory, user, or external device, processing that data based on a control program stored in the memory, and generating output data as a result of such processing of the input data.

'Computer-readable medium' is a 'memory.'

'Memory' can be a random access memory (RAM), read-only memory (ROM), hard-disk drive storage unit, tape drive, compact disc (CD), digital versatile disk (DVD), or any other device capable of storing data in digital or analog form, whether in optical, electrical, magnetic, or other form. 'Memory' includes within its definition any hardware, software, or firmware that can be used by a computer's processor to read, and possibly store, a computer program or data therein.

'Operating platform' refers to an operating system or operating environment that controls the allocation and usage of hardware resources such as memory, processor time, disk space, and input and output units and peripheral devices. Examples of operating platforms include those licensed under the following names: Windows XP, Windows 2000, Windows CE, Windows 98, Windows NT, Mac OS, Unix, Linux, AIX, iSeries, zSeries, Solaris, and others.

'Process' is basically any code that can be executed by a processor. A process can be an application, communication program, or utility program, for example.

'Processor' can be a microprocessor, microcontroller, programmable gate array (PGA), field programmable gate array (FPGA), programmed array logic (PAL), programmed logic array (PLA), and possibly other forms capable of receiving and processing input data under programmed instructions to generate output data.

'Sent' or 'transmit' refers to transmitting data from one element or process to another. It can involve transmission of data or a signal from one element to another, or effectively transmitting such data or signal by making the data processed by one element or module available to another element or module.

'(s)' or '(es)' or '(ies)' immediately following a word means 'one or more of the thing meant by that word.' Thus, 'process(es)' means 'one or more processes.'

General Description of the Computer 10

Figure 1:
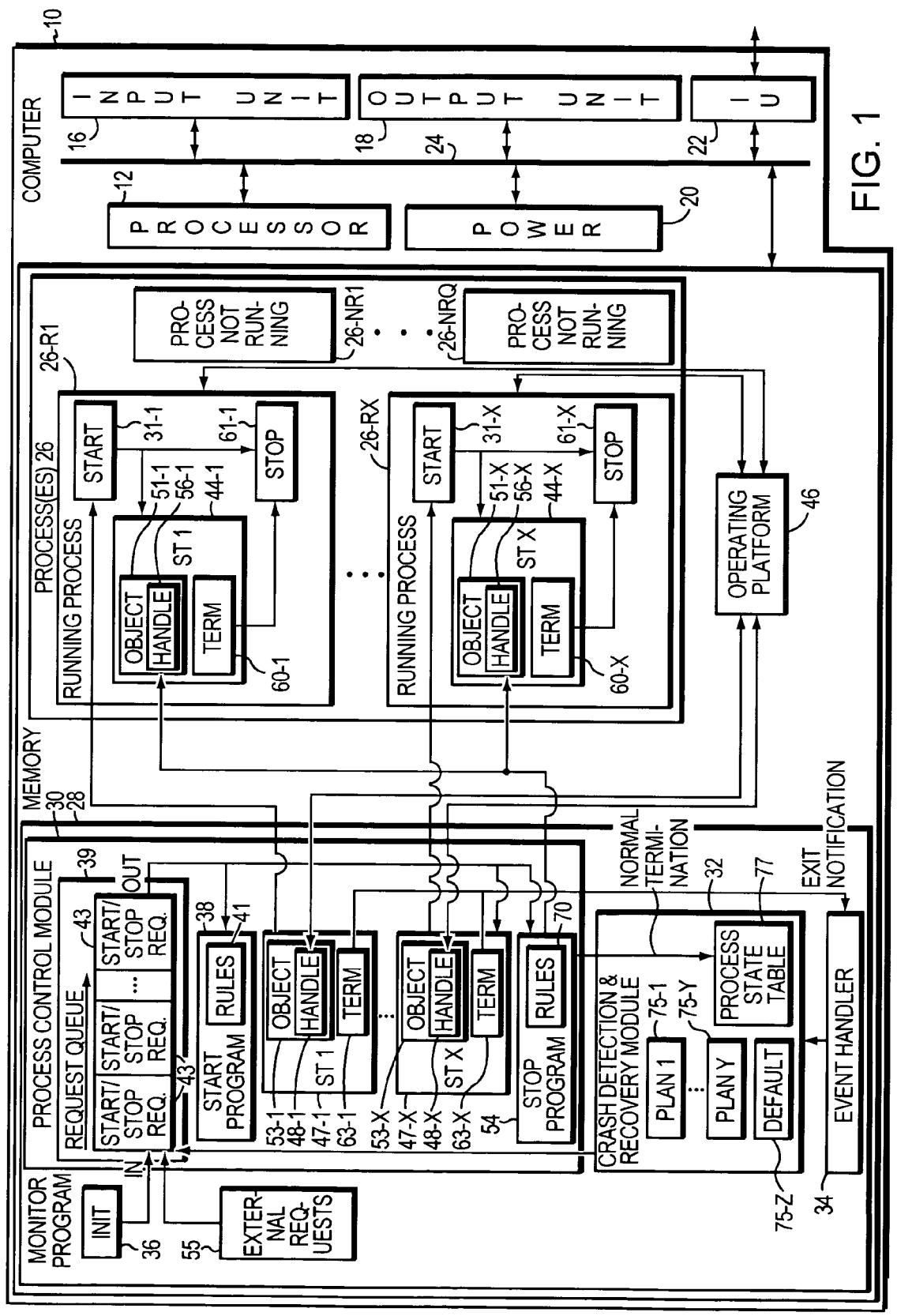
FIG. 1 is a block diagram of an embodiment of a computer having a memory (i.e., computer-readable medium) with a monitor program for controlling one or more processes, and for automatically recovering from a process crash in accordance with the invention.

FIG. 1 is a computer 10 in accordance with an embodiment of the invention. The computer 10 comprises a processor 12, a memory 14, an input unit 16, an output unit 18, optional power source 20, an interface unit (IU) 22, and a bus 24. The processor 12 is coupled to communicate with the memory 14, input unit 16, output unit 18, power source 20, and interface unit 22 via the bus 24. The processor 12 can be coupled to communicate with a device external to the computer 10 via the interface unit (IU) 22.

Processes 26

The memory 14 stores one or more client processes 26 which are executable by the processor 12. The client process or processes 26 can comprise an application, communication program, utility program, or a combination or plurality of such programs. Each client process 26 is executable by the processor 12 to carry out various functions according to its programming. In normal operation, the processor 12 simultaneously runs different processes 26 by multitasking among them. In other words, the processor 12 allocates its processing time for each of the running processes and executes each in turn according to its time allocation.

To provide specific embodiments of the computer 10 and the processes 26 that it can execute, without in any way intending to lessen the broadest scope of the invention enabled herein or the uses to which such computer and processes may be applied, the computer 10 can be implemented as a handheld device such as the Delivery Information Acquisition Device (DIAD) used by drivers and package handlers of UPS, Inc. One client process 26 executable by the DIAD is an application for package pickup and delivery. This application can be programmed to receive data from an external device. This data may indicate addresses to which a handler is to deliver packages along a delivery route, and addresses from which the handler is to pick up packages. Such application can be programmed to permit a package handler to use the input unit 16 and output unit 18 to view data relevant to package pick up and delivery, such as the stop and pick up and delivery addresses. It may further capture data relevant to package pickup and delivery, such as data indicating the fact that the package handler has picked up or delivered a package, the time and date of pickup or delivery of a package, data representing the signature of a person receiving the package to acknowledge its pick up or delivery, etc. In addition, the application can be programmed to enable the driver to receive a manifest of packages to be shipped by a shipper. The computer 10 can be coupled wirelessly or by direct connection through the interface unit 22 to an external device such as through a docking station, a tracking server, etc., to receive data from such external device and to provide captured data to such external device. The captured data can be provided to such external device for the purpose of billing, logistics, package tracking, etc.

Furthermore, the process or processes 26 can comprise one or more communication programs which enable the computer 10 to communicate with a device external to the computer 10. For example, one such communication program can detect that the computer 10 is plugged into a docking station permitting charging of its power source 20 which can be implemented as a rechargeable battery. In response to the event of connection to the charging station, a communication program can be executed by the processor 12 to cause the computer 10 to initialize communications with another device, trigger the transmission of data, or other activity.

The foregoing are merely examples of processes 26 that can be stored in the computer 10 for execution. Those of ordinary skill in the art will appreciate that other applications, communication programs, and utility programs, whether or not relevant to package pick up or delivery, can be used with the computer 10 according to the purpose to which the computer is applied. The context of package handling is thus exemplary only, and the disclosed invention can be applied to purposes wholly unrelated to package handling and shipment.

The processes 26 are provided with respective supervisory threads 44 which include interprocess communication objects 51 (e.g., an event, semaphore, mutex, or other mechanism) with handles 56 that enable the process control module 30 to stop the running process 26. In addition, the supervisory threads 44 can be provided with termination (TERM) code 60 which defines any processing to be carried out by the process 26 when signaled to terminate by the monitor program 28. Such processing can involve saving data or performing other tasks prior to the process terminating. Further details regarding these features are provided hereinafter,

Monitor Program 28

The memory 14 stores a monitor program 28 which is executable by the processor 12 to monitor and, as necessary, control any process 26 running on the computer 10. The monitor program 28 also permits a running process to request start or stop of another process. In the embodiment of FIG. 1, the monitor program 28 advantageously comprises code that is separate from the processes 26. It thus can control such processes even in the event one or more of the processes crashes. In other words, the ability of the monitor program 28 to execute on the computer 11 is not affected by the status of the processes 26. This provides the monitor program 28 with the capability to recover in the event of a crash of one or more processes 26.

The monitor program 28 comprises a process control module 30, crash detection and recovery module 32, and an event handler 34. Each of these modules is discussed in detail below.

Process Control Module 30

The process control module 30 has the following capabilities: (1) to start or stop any of the client processes; (2) to determine whether a client process is running; and (3) to enable another client process to start or stop a client process.

At a general level, the process control module 30 comprises start program 38 for executing start requests 43, and a stop program 54 for executing stop requests 43. The process control module 30 may also comprise a queue 39 for storing start and stop requests 43 on a first-in-first-out (FIFO) basis for execution by the start program 38 and stop program 54 as appropriate, and one or more supervisory threads 47 it creates for each running process 26 when it starts the process to enable the monitor program 28 to detect a crash of that process. The start program 38 receives start requests 43 from the queue 39 and decides based on rules 41 whether each request can be executed. If so, then it will create a supervisory thread 47 external to the process 26 to enable the process to be monitored to determine whether it has stopped. If rules 41 do not allow, the start program 38 can reject the start request 43 or return it to queue 39 until one or more contingencies have occurred which permit the process to be executed. The stop program 54 handles all stop requests 43 from the queue 39. When it receives a stop request 39 from the queue 39, it evaluates the request with rules 70 to determine whether the stop request can be executed. If so, it signals the object 51 of the process 26 that is the target of the request using the handle 56 of its interprocess communication object 51, causing the process to execute its customized termination code 60 prior to terminating. The stop program 54 also notifies the crash detection and recovery module 32 of the process it is stopping when executing a stop request so that such module is informed that the process's termination is normal and not the result of a crash. Conversely, if rules 70 do not permit the stop program 54 to carry out the stop request, then it may queue the stop request until circumstances permit its execution, or it may reject the stop request altogether. The manner in which stop or start requests are introduced to the process control module 30, more specifically, its queue 39, can arise from several scenarios which are now addressed in detail.

The computer 10 loads and executes the process control module 30 upon booting up the computer. The process control module 30 comprises an initialization (INIT) function 36 which defines a set of one or more processes 26 that are to be started by the processor 12 in response to boot up of the computer 10. Furthermore, the INIT function 36 can define a set of one or more processes to be executed upon restart of the computer 10, and this set of processes need not necessarily be the same processes executed upon boot up. The monitor program 28 is configured within the operating platform to be executed upon startup of the device. The processor executes the monitor program 28 which runs the INIT function 36 that launches start program requests for the defined set of initial processes. In the event more than one process is running, as previously mentioned, the processor normally multitasks between the running processes 26 by allocating its processing time between the running processes.

A running process 26 can request the processor 12 to start or stop another process. More specifically, a client process 26 can transmit a request 43 to the queue 39 for execution by the start program 38 to start, or the stop program 54 to stop, a target process designated by the request. The request 43 can include data indicating the target process for which start or stop is requested and the process initiating the request. When the request 43 advances to the end of the queue 39, it is analyzed by the start program 38 or stop program 54, as appropriate for the type of request, which determines whether the target process is one that can be started or stopped by the requesting process. The start program 38 determines whether the target process can be started or stopped on the basis of one or more of several criteria defined by rules 41, 70. In one embodiment of the start program 38 and stop program 54, the requesting process is assigned through the rules 41, 70 a privilege granting it the ability to start or stop the target process, or conversely, the process can be assigned a restriction prohibiting it from starting or stopping the target process, depending upon how the programmer assigns privileges and restrictions to the processes 26. Furthermore, it is possible that the rules 41 of start program 38 or rules 70 of the stop program 54 can be programmed to evaluate the relative priority of requests from originating processes if two or more are issued to a target process. For example, if a start request is originated by a process, the processor 12 can execute the monitor program 28 to determine whether according to the rules 41 a process which previously issued a stop request 43 still in effect for the target process at the time the start request is received, has priority over the request from the requesting process. If so, then the processor 12 can refuse the start request 43 from the requesting process, or it can defer its execution until occurrence of one or more events, such as termination of the stop request by the process having greater priority. Then, further execution of the start program 34 by the processor 12 results in starting of the requested process. Furthermore, the monitor program 28 uses the internal queue 39 to enforce the order in which the start and stop requests are executed. If desired, the queue may be optimized to remove extraneous requests, for example, if a start program request is followed by a stop program request, the start request may be dropped to save processing time.

Furthermore, it should be appreciated that a process 26 can be started or stopped upon receiving a request 43 from a user via the input unit 16. For example, a user of the computer 10 can operate the input device 16 to generate the request 43 provided to the processor 12 to start or stop one or more processes 26. The queue 39 holds the request 43 until it can be executed by the start program 38 or stop program 54 according to the rules 41, 70.

Yet another way in which a process 26 can be started or stopped is in response to a communication from a request 43 generated by an external device received by the processor 12 via the interface unit 22. This request 43 is held in queue 39 until such time as it can be executed by the start program 38 under the rules 41 or the stop program 54 under rules 71.

The foregoing types of requests 43 are indicated in FIG. 1 as external start/stop requests 55 because they originate or are triggered from outside of the process control module 30.

In addition to the INIT function 36 and external start/stop requests 43, start or stop requests 43 can originate from the crash detection and recovery module 32. The manner in which this occurs will be discussed in further detail in a later section addressing the crash detection and recovery module 32.

When a process 26 is started, operating platform 46 creates a handle 48 that identifies the process, and provides the same to the start program 38. The start program 38 monitors this handle 48 from a supervisory thread 47 which it creates and stores in the process control module 30. When a process 26 terminates, operating platform 46 invalidates its handle 48, causing the supervisory thread 47 to be alerted of the fact that a process has terminated. This causes the supervisory thread 47 to generate an exit notification signal to the event handler 34 to initiate a check by the crash detection and recovery module 32 to determine whether the process's termination was normal or the result of a crash.

As previously mentioned, a client process 26 can be modified such that it can be controlled by the monitor program 28. Communication of a stop request from the monitor program 28 to the client process 26 is supported by a unique well-known system identifier, which can be implemented as an event, semaphore, mutex, or other such mechanism for inter-process communication on a computer. A supervisory thread ("ST") 44 is programmed into the client process 26-R that waits for object 51 (e.g., an event, semaphore, mutex, or other mechanism) to be signaled by the monitor program 28. When the monitor program 28 executes a stop request, it signals the object 51 using handle 56, which causes the supervisory thread 44 to activate its custom termination (TERM) function 60, which may be programmed to terminate the process 26. Once the client process is terminated, the invalidation of its process handle 48 by the operating platform 46 signals the corresponding supervisory thread 47 in the monitor program 28 to generate an exit notification to be passed to the event handler 34, which in turn activates the crash detection and recovery module 32.

In normal operation, there will be many client processes 26 running on the computer 10. Thus, in FIG. 1 the supervisory threads 47-1 through 47-X correspond to each process 26-RI through 26-RX that is running on the computer 10. 'R' denotes that the process 26 is running and 'X' represents the number of client processes running on the computer 11. The supervisory threads 47-1 through 47-X remain running in the process control module 30 for as long as their corresponding processes 26 are running. Those processes that are not running are indicated by numerals '26-NR1-26-NRQ' in FIG. 1, 'NR' indicating the state of the process as not running, and 'Q' being the number of processes that are not running.

When executing a stop request 43, the stop program 54 sets a normal termination flag corresponding to the process 26 in the process state table 77 of the crash detection and recovery module 32. Setting of this flag indicates that the process 26 has been requested to stop by the stop program. When a process 26 stops running, its process handle 48 is invalidated by the operating platform 46. This handle invalidation signals the corresponding supervisory thread 47 of process control module 30, causing it to generate an exit notification signal to the event handler 34 which in turn alerts the crash detection and recovery module 32 to check whether the process terminated normally or crashed by referring to the normal termination flags stored in the process state table 77. Further details of the crash detection and recovery module 32 and its operation are now addressed.

Crash Detection and Recovery Module 32

The crash detection and recovery module 32 provides the following functionality: (1) it allows a client process to configure how the module recovers in the event that a process crashes; (2) the module maintains the state of all client processes running on the computer 10 (i.e., data indicating whether the process is or is not running, and whether it has terminated normally or crashed); (3) the module detects crashes of client processes; and (4) upon detection of a process crash, the module executes the configured recovery plan for the crashed process.

As shown in FIG. 1, the crash detection and recovery module 32 stores crash recovery plans 75-1 through 75-Y (Y is the number of plans) for one or more processes 26 in the computer 10. The crash recover plans 75-1 through 75-Y can be configured specifically for one or more corresponding processes 26 to permit the computer 10 to recover from a crash of such processes 26 in a customized manner. For example, a crash recovery plan 75 can specify whether the computer 10 is to recover from a crash of a process 26 by reboot of the computer or restart of the crashed process, or both, following a crash of the process. If a customized plan 75 is not defined for a process 26, then the crash detection and recovery module 32 uses a default plan 75-Z in order to recover from a crash of the process.

The crash detection and recovery module 32 maintains a process state table 77 indicating those processes that are running, and those that are not. The crash detection and recovery module 32 further maintains normal termination flag data received from the stop program 54 for any process that terminates normally, to reflect the fact that the termination was not a crash. Whenever any process terminates, whether properly or as the result of a crash, the operating platform 46 signals the monitor program's supervisory thread 47 for this process through the invalidation of its process handle 48, which then notifies the event handler 30 via an exit notification event that activates the crash detection and recovery module 32. In response to the exit notification signal, the crash detection and recovery module 32 updates its process state table 77 to indicate that the process generating the exit notification has terminated. In addition, the crash detection and recovery module 32 checks the corresponding normal termination flag in the process state table 77 to determine whether the process terminated normally. If so, then the crash detection and recovery module 32 need perform no further processing for the terminated process. Conversely, if the process termination flag indicates that the process terminated abnormally, then the crash detection and recovery module 32 carries out the crash recovery plan 75 corresponding to the crashed process in order to recover from the crash. As previously mentioned, crash recovery plan 75 can be configured specifically for a process 26 in order to define how the computer 10 is to recover from a crash of the process. The crash recovery plan 75 can be one of those designated as 75-1 through 75-Y in FIG. 1 which specify whether the computer 10 should be rebooted, the crashed process restarted, or both, following a crash of a corresponding process 26 in order to recover properly. In addition, such plan 75 can be defined to indicate whether other processes must be restarted or rebooted in order to recover from a crash. In the event that a crash recovery plan 75 is not specifically defined for the process 26, the crash detection and recovery module 32 uses the default recovery plan 75-Z to recover from the crash and restore the process to run on the computer 10. Execution of the crash recovery plan 75 appropriate for a crashed process results in generation of one or more start or stop requests 43 that the crash detection and recovery module 32 provides to update the INIT function 36, queue 39, or both.

Event Handler 34

The event handler 34 responds to events generated by the supervisory threads 47 within the monitor program 28. More specifically, when a process 26 exits through execution of termination function 60 and stop code 61, the terminating process signals the supervisory thread 47 of the monitor program 28 by the invalidation of its process handle 48, which causes the monitor program to generate an exit notification event that notifies the event handler 34 of the fact that the process 26 has terminated. In addition, if a process 26 terminates abnormally by crashing, the monitor program 28 notifies the event handler 34 in a similar way. In response to the exit notification, the event handler 34 activates the crash detection and recovery module 32 for use in determining whether the process terminated normally or crashed, based on whether or not the normal termination flag was set by the stop program 54 in the process state table 77 before the process 26 exited.

Method for Monitoring and Controlling a Process Using Supervisory Threads

Figure 2:
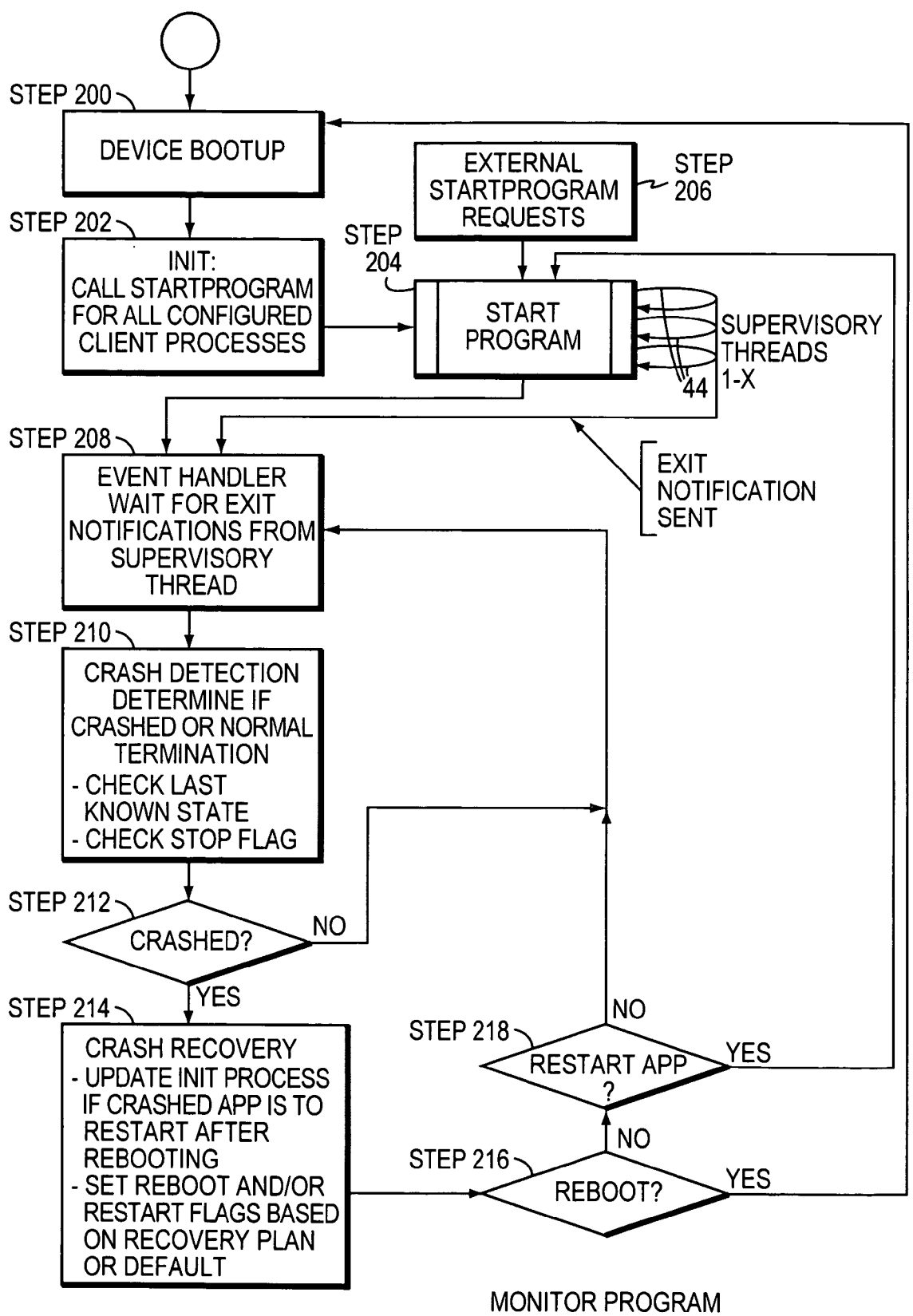
FIG. 2 is a flowchart of an embodiment of a method executed by the monitor program to monitor and control a process using a supervisory thread external to the process, and for executing configurable recovery in the event of a process crash.

FIG. 2 is a flow chart of one embodiment of a method for monitoring one or more processes 26 using associated supervisory threads 47 running externally to such process(es) on a computer 10. The monitor program 28 can be programmed for execution by the computer 10 of FIG. 1 in order to carry out the steps of the method of FIG. 2.

In Step 200 of FIG. 2 a device 10 is booted up. In Step 202, in response to the booting, the device 10 executes an initialization (INIT) program 36. This causes the processor 12 to start a set of one or more processes 26 defined by the initialization program 36. More specifically, through its execution, the initialization program 36 issues one or more start requests 43 for target processes 26 to the start program 38. The initialization program 36 is programmed to start a specific set of processes 26 on boot up. In Step 204, the start program 38 receives start request(s) 43 from its queue 39 and executes the same. As each process 26 starts, the start program 38 receives a handle 48 for the started process 26 from the device's operating platform 46. Each handle 48 provides the ability to determine the running state of its respective process 26-R externally to the process. The client process 26 is programmed to create a supervisory thread 44 upon starting and incorporates such supervisory thread 44 along with interprocess communication object 51 and handle 56 into the process 26. In addition, the start program 38 generates supervisory thread 47, incorporating the object 53 with handle 48 therein, so that the monitor program 28 can monitor the running state of the process 26 externally thereto. In Step 206, the start program 38 receives external start request(s) 43 resulting from a variety of possible sources, including another running process 26, a user's operation of the input unit 16, from an external device via the interface unit (IU) 22, or a combination of the foregoing. Such start request(s) 43 are handled as described previously by queueing the requests until such time as the start program 38 can execute the same. Assuming the request(s) 43 can be processed according to applicable rules 41, the start program 38 starts such process(es) 26, receives the corresponding handle(s) 48 from the operating platform 46, and creates a supervisory thread(s) 47 incorporating respective object 53 and handle 48, so that the process(es) 26 can be monitored. As mentioned, the processes 26 create their own supervisory threads 44 incorporating interprocess communication object handles 56 received from the operating platform 46, thus enabling the process control module 30 to control the processes 26.

In Step 208 the event handler 34 awaits exit notification from the supervisory thread(s) 47 in response to a corresponding handle(s) 48 being invalidated by the operating platform 46, indicating that the corresponding process 26 has been stopped. In Step 210, in response to the event handler's detection of an exit notification, crash detection and recovery module 32 executes to determine whether the exit notification was the result of normal termination or a crash of the process 26. The module 32 performs this function by checking to determine whether the stop program 54 set a normal termination flag in the process state table 77 before terminating the process 26. If the normal termination flag was set by the stop program 54, then such process has not crashed and control returns to Step 208 in which the handler 34 continues to monitor each running process for exit notification. Conversely, if in Step 212 the normal termination flag for the process has not been set in the process state table 77, then the process is terminating as the result of a crash. In this case, control remains with the crash detection and recovery module 32 which updates the set of INIT processes 26 to be restarted based on the value of the restart flag stored in the process state table 77. It also sets reboot and/or restart flags according to the crash recovery plan 75 defined for the crashed process 26. If no recovery plan 75 is specified for the crashed process 26, then the module 32 uses the default plan 75-Z to set (or reset) the reboot and/or restart flags appropriately to recover from the crash. In Step 216, the module 32 determines whether the crash recovery plan calls for reboot of the computer 10. If so, then processing performed by the processor 12 proceeds to Step 200 for device boot up. Conversely, if the reboot flag is not set, then in Step 218 the processor 12 executes the module 32 causing it to restart any process identified as requiring restart in the process state table 77 for the plan 75 being executed. If the processor's execution of the module 32 indicates that no process requires restart, then control proceeds to Step 208 for the event handler 34 to continue monitoring running processes 26 for exit notification. If the module 32 determines in Step 218 that restart is necessary, then the module 32 transmits its start requests 43 for queuing to the start program 38 for execution in Step 204 to start the process(es) designated by the recovery plan in Step 214. After execution of Step 204, control proceeds to Step 208 in which the event handler 34 monitors running processes 26 using corresponding supervisory threads 47.

Figure 3:
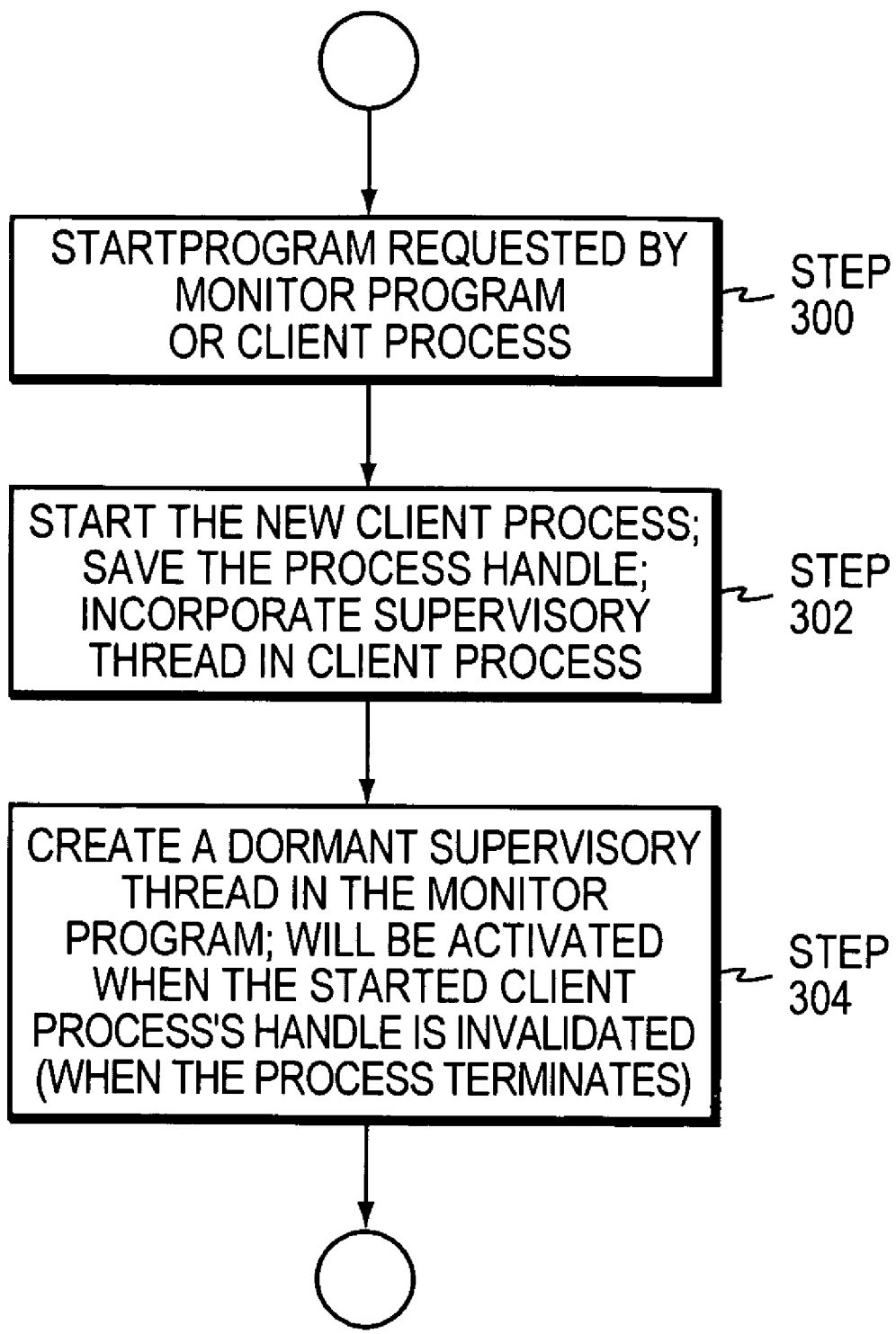
FIG. 3 is a flowchart of an embodiment of a method executed by the start program of the monitor program to start a process and create a supervisory thread to control the process.

FIG. 3 is a flowchart of one embodiment of a method of starting a process 26 on a device 10. In Step 300 a start request 43 is issued by the monitor program or client process 26-R that is requesting start of the target process 26-NR. The start request 43 is stored in queue 39 while it awaits servicing by the start program 38. In Step 302 the start program 38 starts the new process 26. The start program 38 does so by requesting the operating platform 46 to start the requested process 26. The start program 38 receives the handle 48 for the started process from the operating platform 46, and saves the handle in memory. The client process 26 incorporates a supervisory thread 44 with object 51 and handle 56 to enable it to be controlled by the monitor program. In Step 304 the start program 38 creates a dormant supervisory thread 47 with object 53 and handle 48 within the monitor program 28, which is activated when the started client process's handle is invalidated (i.e., when the process terminates). Activation of the supervisory thread 47 causes it to issue an exit notification to the event handler 34 which in turn advises the crash detection and recovery module 32 to check whether the process's exit was normal or the result of a crash.

FIG. 4 is a flowchart of one embodiment of a method of stopping a process 26 on the device 10. In Step 400 the monitor program 28 or a client process 26-R issues a stop request 43 targeted at another process 26-NR. The stop request 43 is queued until such time as it can be executed by the stop program 54. In Step 402 the stop program 54 determines whether the process should be restarted after it is stopped. It may make this determination based upon the rules 70, a crash recovery plan 75, or both. If the stop program 54 determines in Step 402 that the process should not be restarted, then in Step 404 it sets a flag corresponding to this process to indicate that the process should not be restarted after it is stopped. Conversely, if in Step 402 the stop program 38 determines that the process should be restarted after it is stopped, then in Step 406 it sets the corresponding flag in the table 77 to indicate that such process should be restarted after it is stopped. In Step 408, the stop program 38 is executed by the processor 12 to determine whether the device 10 should be rebooted after the target process is stopped. If not, then in Step 410 the stop program 54 sets the corresponding flag to indicate that the device 10 should not be rebooted after the target process is stopped. Conversely, if in Step 408 the stop program 54 determines that the device 10 should be rebooted after the target process is stopped, then in Step 412 the stop program 54 sets the corresponding flag in the process state table 77 accordingly. In Step 414 the stop program 54 signals the interprocess communication object 51 in the client process's supervisory thread 44, causing the same to issue a stop request to the target process 26.

FIG. 5 is a flowchart of one embodiment of a method of stopping a client process 26 executing on the device 10. In Step 500 the client process 26 executes normal client processing according to its code as it runs. In the absence of a stop request, normal client processing of Step 500 proceeds through the normal termination of the process 26. However, in this case, in Step 502, the stop program 54 issues a stop request to the supervisory thread 44 for the process 26. The stop request activates the supervisory thread 44 for the process 26 by signaling the interprocess communication object 51 of the supervisory thread 44. In Step 504, the process 26 can perform any customized exit processing according to its programming 60 before it stops executing before execution of stop code 61.

Alternatives

Those of ordinary skill in the art will recognize that there are many modifications that are possible without departing from the scope of the invention. For example, rather than storing the crash recovery plans 75 in the crash detection and recovery module 32, such plans can be stored elsewhere in memory 14, either apart from the disclosed modules or within such modules as in the supervisory threads 44 or 47 of respective processes 26. Similarly, the termination code 60 defining the code to be executed when a process 26 is signaled to exit by a corresponding supervisory thread 44 can be stored separately from the running process 26 and retrieved for execution when the supervisory thread 44 is signaled to exit. The process state table 77 need not be stored in the crash detection and recovery module 32, but could be stored in another location in the memory 14 accessible to the module 32 and the event handler 34. Although the rules 41, 70 are normally stored separately from the processes 26, the rules applicable to a particular process 26 could be stored within such process or the associated supervisory thread 44 at the possible disadvantage of obscuring the rules. The process control module 30, event handler 34 and crash detection and recovery module 32 can be combined into larger or divided into smaller code segments according to their functions without departing from the scope of the invention. These and other modifications will be understood by those of ordinary skill in the art to be within the scope of the invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method comprising the steps of:
    starting, by one or more processors, a client process by
        (i) creating a first handle corresponding to the client process,
        (ii) creating a first supervisory thread, the first supervisory thread being external to the client process and being adapted for monitoring the client process,
        (iii) storing the first handle in the first supervisory thread, and
        (iv) creating a second supervisory thread with a second handle, the second supervisory thread being internal to the client process and being adapted for stopping the client process;
    in response to receiving a stop request, stopping the client process by signaling an interprocess communication object using the second handle of the second supervisory thread in the client process;
    receiving normal termination data in response to the client process terminating normally from the stop request, the normal termination data indicating that the client process terminated normally;
    receiving an exit notification signal from the client process via the first supervisory thread, the exit notification signal indicating that the client process terminated;
    in response to receiving the exit notification signal, determining whether termination of the client process was normal by checking whether the terminated client process has corresponding normal termination data in a process state table; and
    executing one or more crash recovery plans in response to determining that the client process terminated as the result of a crash.

2. A computer-implemented method as claimed in claim 1 wherein the interprocess communication object comprises a semaphore, a mutex, an event, or a combination thereof.

3. A computer-implemented method as claimed in claim 1 further comprising the step of:
    in response to receiving the stop request, determining whether the process can be stopped based on one or more rules defined externally to the client process, the stopping performed in response to determining that the client process can be stopped based on the one or more rules.

4. A computer-implemented method as claimed in claim 1 wherein the request is received from another process executed by the processor.

5. A computer-implemented method as claimed in claim 1 wherein the request is received from a user via an input unit of the computer.

6. A computer-implemented method as claimed in claim 1 wherein the request is received from an external device via an interface unit of the computer.

7. A computer program product comprising at least one computer-readable storage medium having computer-readable program code portions stored therein, the computer-readable program code portions comprising:

an executable portion configured to start a client process by
(i) creating a first handle corresponding to the client process,
(ii) creating a first supervisory thread, the first supervisory thread being external to the client process and being adapted for monitoring the client process,
(iii) storing the first handle in the first supervisory thread, and
(iv) creating a second supervisory thread with a second handle, the second supervisory thread being internal to the client process and being adapted for stopping the client process;

an executable portion configured to, in response to receiving a stop request, stop the client process by signaling an interprocess communication object using the second handle of the second supervisory thread in the client process;

an executable portion configured to receive normal termination data in response to the client process terminating normally from the stop request, the normal termination data indicating that the client process terminated normally;

an executable portion configured to receive an exit notification signal from the client process via the first supervisory thread, the exit notification signal indicating that the client process terminated;

an executable portion configured to, in response to receiving the exit notification signal, determine whether termination of the client process was normal by checking whether the terminated client process has corresponding normal termination data in a process state table; and an executable portion configured to execute one or more crash recovery plans in response to determining that the client process terminated as the result of a crash.

8. A computer program product as claimed in claim 7 wherein the interprocess communication object comprises at least one of a semaphore, a mutex, an event, or a combination thereof.

9. A computer program product as claimed in claim 7 further comprising:

an executable portion configured to, in response to receiving the stop request, determine whether the process can be stopped based on one or more rules defined externally to the client process, the stopping performed in response to determining that the client process can be stopped based on the one or more rules.

10. A computer program product as claimed in claim 7 wherein the request is received from another process executed by the processor.

11. A computer program product as claimed in claim 7 wherein the request is received from a user via an input unit of the computer.

12. A computer program product as claimed in claim 7 wherein the request is received from an external device via an interface unit of the computer.

13. A computer comprising:

a memory storing a monitor program including a process control module (a) starting or stopping client processes based on rules defined for the client processes and stored in the memory; (b) starting a client process by (i) requesting an operating platform to start the client process, (ii) receiving a first handle corresponding to the client process from the operating platform, (iii) storing the first handle in a first supervisory thread in the process control module, the first supervisory thread being external to the client process and being adapted for monitoring the client process, and (iv) generating and incorporating a second supervisory thread with a second handle into the client process, the second supervisory thread being adapted for stopping the client process; and (c) stopping the client process by signaling an interprocess communication object using the second handle of the second supervisory thread in the client process;

a crash detection and recovery module (a) storing crash recovery plans for one or more of the client processes, the crash recovery plans defining how the computer is to recover from crashes of the client processes; (b) maintaining a process state table; (c) receiving normal termination data from the process control module if the client process has terminated normally, the normal termination data indicating that the client process terminated normally; (d) receiving an exit notification signal from the client process via the first supervisory thread, the exit notification signal indicating that the client process terminated; (e) checking to determine whether termination of the client process was normal in response to receiving the exit notification signal by checking whether the terminated client process has corresponding normal termination data in the process state table; and (f) carrying out one of the crash recovery plans in response to determining that the client process terminated as the result of a crash; and a processor connected to the memory, and executing the process control module and the crash detection and recovery module to perform the stated functions.

14. A computer as claimed in claim 13 wherein the memory further stores an event handler receiving exit notification signals from the process control module indicating that the client processes have terminated, the event handler notifying the crash detection and recovery module of the exit notification signals, the crash detection and recovery module determining whether client process termination was normal.

15. A computer as claimed in claim 13 wherein the process control module has a queue storing start and stop requests to be executed by the process control module as permitted by the rules.

16. A computer as claimed in claim 13 wherein the process control module further comprises an initialization program configured to (a) define the start and stop requests to be executed upon booting the computer and (b) input the configured start and stop requests into the queue for execution upon booting the computer.

17. A computer as claimed in claim 13 wherein at least one of the start and stop requests input to the queue originates from a running process.

18. A computer as claimed in claim 13 further comprising:
an input device connected to the processor, the input device operable by a user of the computer to input at least one of the start and stop requests to the queue.

19. A computer as claimed in claim 13 further comprising:
an interface unit connected to the processor, the interface unit receiving a start or stop request from an external device and providing the start or stop request to the queue for execution by the process control module.

20. A computer as claimed in claim 13 wherein crash recovery plans define whether the device is to be rebooted, the client processes restarted, or both, following crashes of respective client processes, and the crash detection and recovery module provides the identity of the client processes to be rebooted or restarted to the initialization program to be provided to the queue for execution upon reboot of the computer or restart of a client process.

21. A computer as claimed in claim 13 wherein at least one of the crash recovery plans is a default plan to be used in the event that no custom crash recovery plan is defined for a client process.

22. A computer as claimed in claim 13 wherein at least one of the supervisory threads incorporated into a client process includes termination programming defining actions to be carried out by the client process prior to its termination if it is signaled to stop execution by the corresponding supervisory thread of the process control module.

23. A computer as claimed in claim 13 wherein the client processes are started by a start program of the process control module, and client processes are stopped by a stop program of the process control module.

* * * * *